United States Patent [19]

Evans

[11] Patent Number: 4,856,223

[45] Date of Patent: Aug. 15, 1989

[54] FISHING LURE

[76] Inventor: Steven C. Evans, 10297 NW. 17th St., Coral Springs, Fla. 33065

[21] Appl. No.: 797,782

[22] Filed: Nov. 13, 1985

Related U.S. Application Data

[63] Continuation-in-part of Ser. No. 586,882, Mar. 19, 1984, abandoned, which is a continuation of Ser. No. 213,329, Dec. 5, 1980.

[51] Int. Cl.$^4$ .............................................. A01K 85/00
[52] U.S. Cl. ...................................... 43/42; 43/42.06; 43/42.24
[58] Field of Search ...................... 43/42, 42.06, 42.24, 43/42.28, 42.29, 42.45, 42.48; 428/308.4, 319.9, 306.6

[56] References Cited

U.S. PATENT DOCUMENTS

| | | |
|---|---|---|
| 2,547,240 | 4/1951 | Young . |
| 2,563,825 | 8/1951 | Ebert . |
| 2,648,928 | 8/1953 | Sam . |
| 2,683,323 | 7/1954 | Dudley . |
| 2,745,206 | 5/1956 | Gaw ................................ 43/42.06 |
| 2,765,571 | 10/1956 | Sinclair . |
| 2,797,519 | 7/1957 | Keller ............................... 43/42.06 |
| 2,952,462 | 6/1956 | Planin . |
| 3,009,235 | 11/1961 | Mestral . |
| 3,180,049 | 4/1965 | Gunderson . |
| 3,368,811 | 2/1968 | Finney . |
| 3,469,289 | 2/1969 | Whitacre . |
| 3,627,622 | 12/1971 | Vega ................................ 428/308.4 |
| 3,643,316 | 2/1972 | Girard . |
| 3,721,447 | 3/1973 | Louderback . |
| 3,757,452 | 9/1973 | Parker . |
| 3,803,743 | 4/1974 | Nalepka . |
| 3,815,276 | 6/1974 | Harrison . |
| 3,940,869 | 3/1976 | Roberts . |
| 3,940,873 | 3/1976 | Lawless . |
| 3,983,656 | 10/1976 | Bain ................................. 43/42.24 |
| 4,012,862 | 3/1977 | DuBois . |
| 4,074,455 | 2/1978 | Williams, Jr. . |
| 4,158,927 | 6/1979 | Capra ............................... 43/42.24 |

*Primary Examiner*—Kurt Rowan
*Attorney, Agent, or Firm*—Malin, Haley & McHale

[57] ABSTRACT

A fishing lure detector and method of binding foam or textile material to plastisol. The fishing lure detector member made of foam or textile material is for improving the fishing lures. The fishing lure detector means is connected to a fishing lure body at a position adjacent or in front of the fishing lure hook to aid the fisherman in detecting when a fish strikes the lure and in turn aiding the fisherman to set the hook in the fish. The fishing lure detector member includes resilient open cell plastic material that may be integrally connected to the body of a plastic worm lure or connected to the body of a hard lure. The open cell plastic material is engaged by the fish striking the body of the fishing lure and transmits a tug signal along the fishing lure. The fishing lure body when constructed of a flexible or soft thermoplastic such as plastisol or a polyvinyl chloride allows both the fishing lure body and the detector member to stretch longitudinally with one another. The detector member provides electrical and touch properties similar to the thermoplastic fishing lure worm.

3 Claims, 2 Drawing Sheets

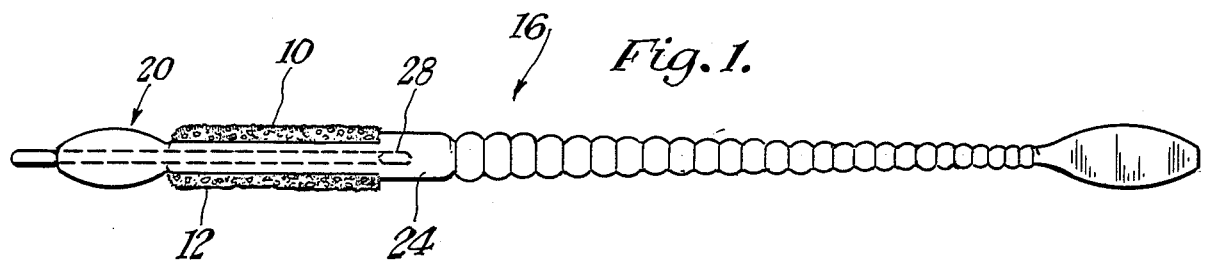
Fig. 1.
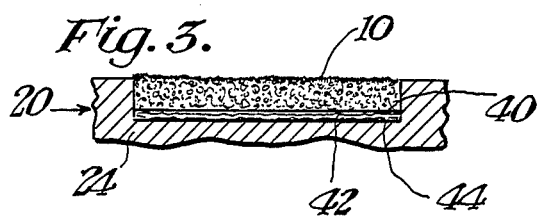
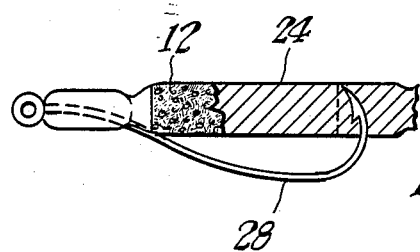
Fig. 3.  Fig. 2.
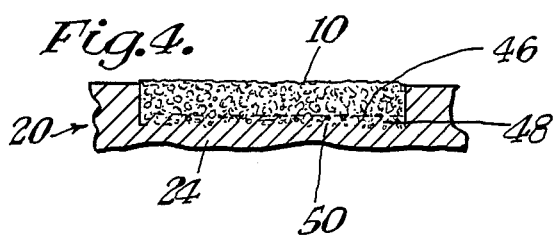
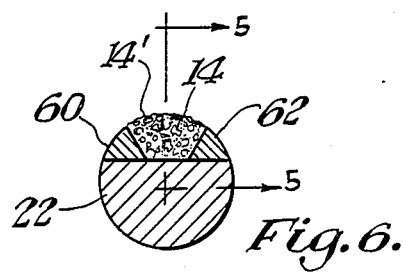
Fig. 4.  Fig. 6.
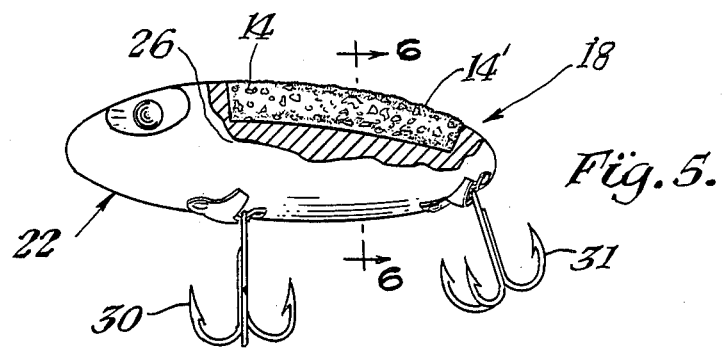
Fig. 5.
Fig. 7.

FISHING LURE

This is a continuation-in-part of application Ser. No. 586,882, filed Mar. 9, 1984, and a continuation of application Ser. No. 213,329, filed Dec. 5, 1980.

BACKGROUND OF THE INVENTION

In the past fishing lures have been proposed such as in the Capra U.S. Pat. No. 4,158,927 without disclosing a practical method of connecting the material to the lure. Others have used metal connectors to connect material to the lure, the Keller U.S. Pat. No. 2,797,519 is one such example.

SUMMARY OF THE INVENTION

This invention relates to a fishing lure combining a lure and a flexible material such as a plastic foam or other material and to the method of manufacturing a combined plastasol plastic material and a foam plastic or textile material or natural material that has a plurality of opening or passage ways therethrough.

The manufacturing process provides a strip of the foam material or other material and moves it along a path at a predetermined speed. The material may be a polyester foam of 10 to 100 or more pores per inch, such materials are well known on the market. The material moves over a transfer roller that touches the bottom of the material and a bath of plastisol material. A coating of plastisol is transferred by the roller. The plastisol moves up the roller as it turns and engages the bottom surface of the material leaving a coating or layer of plastisol thereon. The thickness of the plastisol material placed on the underside of the foam or other material is controlled as is the speed of the material as it moves away from the roller through a drying area such as blowers. The dryers in the dryer area and the speed of the material and the amount of liquid plastisol placed on the bottom of a predetermined thickness of the moving strip of material governs the amount of penetration of the plastisol into the material. Desired penetration is approximately half the distance or less into the material. The material dries as it moves through the drying area and past the drying apparatus.

The plastisol is physically wed to the material. That is, the plastisol surrounds portions of the material and connects itself to the material and therefore becomes physically bound to or intertwined with the material. The process combines a plastisol material, that is hard to connect to anything, with the material such as foam, leaving one side of the foam in its original state and the other side with a layer of exposed plastisol. Plastisol is also intertwined partially into the material, thus providing the common plastisol bonding surface and prevention of further penetration of the first material by additional plastisol material during the mold filling stage thereby allowing the original or pre-penetration surface on one side to be used as a detector when the material is connected to a plastisol fishing lure.

In the construction of an article such as a fishing lure, the worm shaped fishing lure is made of plastisol. The plastisol and foam material composite is placed into a worm shaped lure mold with the foam material contacting the inner mold surface. The worm mold is prepared and opened. The material is combined with plastisol already as disclosed above, connected to a portion of the mold with the plastisol side adjacent the cavity and the foam side lying against the mold face. As the mold is filled with additional plastisol material, the worm is formed in the cavity. The prepared material is bound to the plastisol on the base of the foam material. This process allows one to manufacture produces having at least a portion of it with a material having a surface in its regular state and bound to a larger mass of plastisol material.

The fishing lure detector provides an improved means for detecting fish biting on the lure in order to signal the fisherman by a deliberate solid tugging or pulling signal to set the hook.

The detector transmits a deliberate solid tugging or pulling signal to the angler which is considerably different from the short strike which is felt when the resilient, smooth body of an ordinary worm is hit. This different is easilly noticed when the fish is sampling the worm from the tail and is working its way up to the head of the worm. While the sampling is being done behind the setting portion, that portion behind the hook, short strikes are felt. When the teeth of the fish engage in the detector these short strikes are (converted) feld as solid tugs or pulling signals. The hook can then be set firmly. If a fish strikes the head of the worm first the strike is magnified tremendously over the same strike on a ordinary worm and the hook setting reaction of the angler is increased and the momentary hesitation of the fish allows the angler to set the hook with successful results.

The fishing lure is improved by having a body with a preselected hook portion located relative to the fishing lure detector in order to detect when a fish bites the fishing lure and is positioned relative to the hook to allow the fisherman to set the hook in the fish.

The fishing lure detector includes a generally resilient open cell plastic material member. The member may be formed by cutting an open cell material. The member is connected to the hook portion of the fishing lure body. The open cell plastic material is operably positioned at the hook portion to engage the teeth of the fish biting the hook portion of the fishing lure. The resilient open cell plastic material acts as a signal means for the fisherman without providing any warning to the fish that the material differs from the surrounding lure.

The hook portion and other parts of the fishing lure body may be a flexible or soft thermoplastic such as plastisol polyvinyl chloride such as used to make plastic worms. The hook portion may also be constructed of hard material in hard lures. Such hook portions may be shaped to receive the fishing lure detector and not lose the balance or action of the hard reuseable lure. In the hard lure the detector is recessed and protected so the lure can be used repeatedly before it needs to be discarded.

The open cell plastic material may be connected to the plastic worm body by having the connecting material infiltrate a portion of the open cell structure or the connecting material may be applied by coating one surface or spraying one surface. An adhesive layer may be attached to the underside of the fishing lure detector. All of these processes may be done prior to molding the fishing lure in a molding cavity with the processed open cell material in order to produce the new and improved fishing lure with the open cell material detector. The use of various adhesives may make it possible to adhere the detector to the body of the lure after it has been molded.

The colors of the open cell plastic material may be dyed the same color tone as the fishing lure body.

The plastic open cell material is preferably in fine porosity polyester-polyurethane foam plastic material in the 80 to 100 pores per inch range. The connecting material connecting the open cell material to the plastic worm or other lures may be the same material used to manufacture the plastic worm.

It is an object of this invention to provide a fishing lure detector that is pliable so that it may stretch with the pliable plastic worm. Unlike many cloth or velcro materials.

Another object is to provide a plastic foam detector for a plastic lure that provides similar touch characteristics.

It is another object of this invention to provide a fishing lure detector that may be cut into very thin strips so it will not noticeably change the shape of the fishing lure and still allow the body of the plastic worm to be wide enough so as not to weaken it.

A further object of this invention is to provide a fishing lure detector that has no tell-tale fibers or threats protruding from the material as when cloth material is used.

A further object of this invention is to provide a fishing lure detector that is made of a plastic material to prevent warning the fish of its presence.

A further object of this invention is to provide a fishing lure detector on each side of the body allowing the hook to be set, through the center, when the lure is rigged in what is commonly called Texas rigging.

A further additional object is to provide a fishing lure detector that can be set through the thin layer of foam material if slight misalignment occurs while rigging.

Another object is to provide a method of binding foam plastic material to a body of plastisol.

In accordance with these and other objects which will be apparent hereinafter, the instant invention will now be described with particular reference to the accompanying drawings.

BRIEF DESCRIPTION OF THE DRAWING

In the drawing:

FIG. 1 is a top view of a plastic worm fishing lure with two detectors.

FIG. 2 is a side view of a portion of the plastic worm shown in FIG. 1.

FIG. 3 is a cross-sectional view of a detector member connected to the fishing lure body by one method.

FIG. 4 is another cross-sectional view of the detector member connected to an impregnated material.

FIG. 5 is a side view of a hard lure with a detector member.

FIG. 6 is a cross-section of FIG. 5 taken along line 6—6 and looking in the direction of the arrows.

FIG. 7 is a magnified view of the surface of the lure detector material.

DESCRIPTION OF THE PREFERRED EMBODIMENTS

Figure 8:
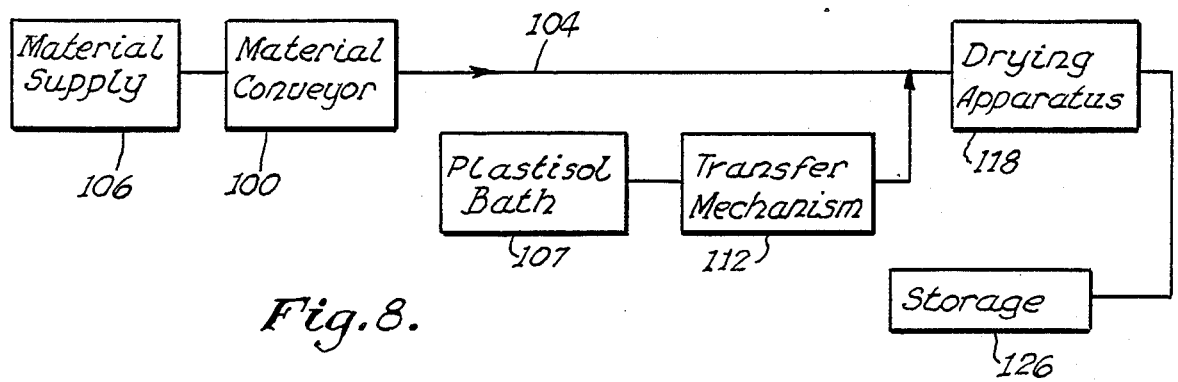
FIG. 8 is a block diagram of the method of manufacture.

Referring to FIGS. 8, 9, 10 and 1 and 2, the disclosure sets forth a fishing lure detector 10 on a lure and method of binding plastisol 108 to a foam material 104 or textile material.

The fishing lure 16 combining a worm type lure or other lures and a flexible material 10 such as a plastic foam or other material shown in FIGS. 1 and 2. The method of manufacturing shown in FIGS. 8, 9, 10 and 11 combines the plastisol plastic material 108 and a foam plastic 104 or textile material or natural material that has a plurality of openings or passages therethrough.

Figure 9:
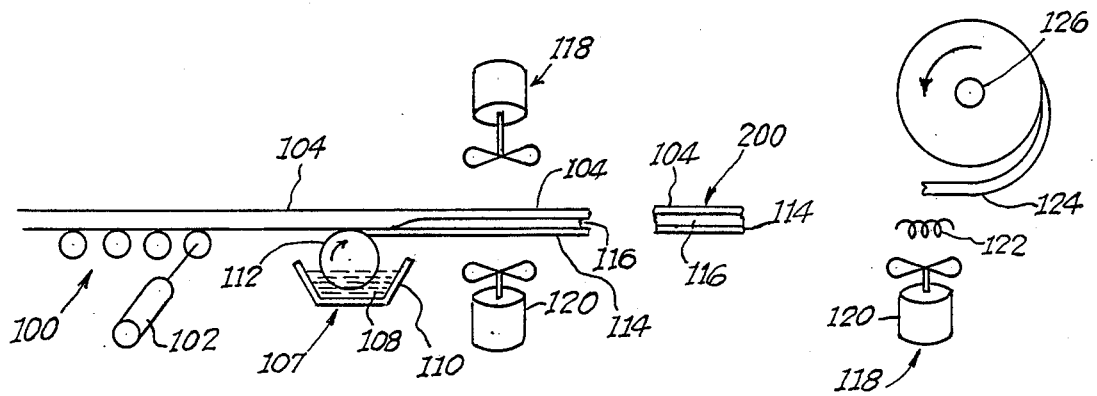
FIG. 9 is an illustration of the manufacturing method.

The manufacturing process provides a strip of the foam material 104 or other material and moves it along a path shown in FIGS. 8 and 9 at a predetermined speed such as 24 feet per minute. The material may be a polyester foam of 10 to 100 or more pores per inch, such materials are well known on the market. The material moves over a transfer roller 112 moving faster than the material to build up as shown in 113. The roller 112 touches the bottom of the material 104 and a bath 107 of plastisol material 108 in pan 110. A coating of plastisol 114 is transferred by the roller 112. The plastisol moves up the roller as it turns and engages the bottom surface of the material leaving a coating or layer 114 of plastisol thereon. The thickness of the material placed upon layer 104 is approximately one ounce of liquid per six feet of material or foam. The plastisol is placed on the underside of the material, such as a one eighth of an inch thick material of five sixteenths inch wide, the speed of the material approximately 24 feet per minute moves away from the roller through a drying area of approximately a ten inch span where blowers 120 are located. Cooling coils 122 may be used to aid cooling. The dryers in the dryer area and the speed of the material and the amount of liquid plastisol placed on the bottom of a predetermined thickness of the moving strip of material governs the amount of penetration of the plastisol into the material. Desired penetration is approximately half the distance or less into the material as shown in FIG. 9. The material dries as it moves through the drying area and past the drying apparatus.

The supply of material 106 is moved onto a conveyor 100 with drive means 102. The bath 107 and transfer mechanism 112 coat the material with plastisol. After the material is dried at 118 it is stored on a roll 126.

The plastisol 108 is physically wed to the material. Plastisols manufactured by Loes Enterprises, 1457 Iglehart Avenue, St. Paul, Minn. may be used. Materials that have been tested and found useable are: Loes Viking TLC 119, VP-7-372-483-58-483-62; VP 193773; G.;b 40 T.3 N.37; PJG 122.2; TGL 178-11; VP 193454; TGL 187-12B; VP 193791 and TGL 178-18. Additional plastisols that can be used are from M & R Plastic Coatings, Inc. of 11460 Dosett Road, Maryland Heights, Md. 63043. Their plastisol produce V-407-2. That is, the plastisol penetrates a portion of the material 104 and connects itself to the material as shown at 116 and therefore becomes physically bound to or intertwined with the material. The process combines a plastisol material, that is hard to connect to anything, with the material such as foam, leaving one side of the foam in its natural or pre state 104 and the other side with a layer of exposed plastisol 114. Plastisol is also intertwined partially into the material.

Figure 10:
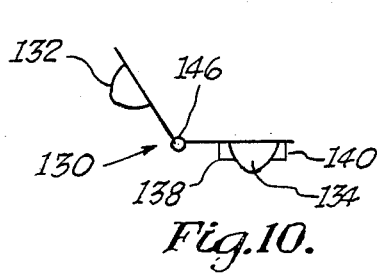
Figure 11:
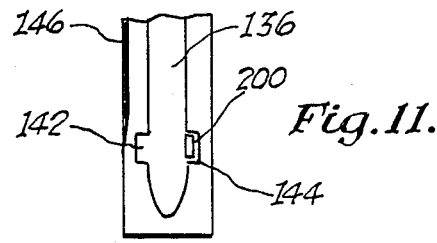

In the construction of an article such as a fishing lure, the worm shaped fishing lure is made of plastisol in mold 130 FIG. 10. The worm mold 130 is prepared and opened. The material is combined with plastisol already as disclosed above, connected to a portion of the mold such as at 142 and 144 in FIG. 11 and as shown at 200 in FIG. 9. The plastisol side 114 adjacent the cavity and the foam side 104 lying against the mold face. As the mold is filled with additional plastisol material into cavity 136, the worm is formed in the cavity 136. The prepared material is bound to the new plastisol poured into the cavity. The base 114 of the foam material connects to the new material. This process allows one to manufacture products having at least a portion of it with a material having a surface in its regular state and bound to a larger means of plastisol material.

Industrial foams may be used, such as a filter foam with a completely open cell polyester-polyurethane, especially adapted to air and liquid filtration, in a range of controlled cells from 10 pores per inch to 65 PPI or a completely open cell polyester-polyurethane, available in 80 to 100 pores per inch may be used.

Referring now to FIGS. 1 and 2 showing one preferred embodiment, the fishing lure 16 includes detector members 10 and 12. Another embodiment is illustrated in FIG. 5 showing fishing lure 18 including detector member 14. The fishing lure detector members 10, 12 and 14 are connected to the fishing lures 16 and 18 each having a body 20 and 22 with a body hook portions 24 and 26 respectively. The hook positions include fishing lure hooks 28, 30 and 31. Fishing lure portion 24 includes hook 28. Hook 28 is illustrated in a preferred position in FIG. 2 with the detector members forward of the pointed barbed end of the hook. Fishing lure portion 26 includes hooks 30 and 31. The detector members aid the fisherman in hooking a fish touching the fishing lure detector member with its teeth or other parts of the fish's body. The members 10, 12 and 14 are connected to the plastisol worm 16 by plastisol approximately halfway through the member. The original surface 200 is then able to have eyes 202 connected by glue or mechanical means. A member like 14 may be connected to the bottom of lure 22 at 204 to allow the hook to be connected to the foam member 14. The body 206 may therefore be made of plastisol.

The fishing lure detector members include resilient open cell plastic material such as shown in cross-section in FIGS. 3 and 4 and shown in an enlargement in FIG. 7. The detector members 10 or 12 may be connected to the body 20 of the fishing lure in the hook portion 24 as shown in FIG. 3 by use of a connector member or second layer 42 connected between the hooks portion or third layer 24 and detector member or first layer 10 with adhesive interface 40 and 44. The detector members 10 or 12 may be integrally connected to the fishing lure 16 on the hook portion 24 of the body 20 as shown in FIG. 4. The fishing lure material is allowed to penetrate past surface 50 into the detector member 10 as shown at 48 to dashed line 46. The lower surface 50 of detector member 10 may be pre sprayed with a coat of the lure body material to reduce the amount or depth of penetration of the body material during the molding process. The body 20 is made of plastic such as plastisol or polyvinyl chloride or any other material suitable for this type of fishing lure. The detector member is an open cell plastic material such as a polyester polyurethane foam plastic material of between 80 to 100 pores per square inch for one example. The detector material 10 or 12 is operably positioned at and in front of the hook portion to engage a portion of the fish body or the teeth of the fish in order to transmit a solid tugging or pulling signal to the fisherman. The signal allows the fisherman to set the hook. The open cell plastic material interacts with a fish to provide a signal transmitted up the fishing line to the fisherman. The material used for the detector is such that no threads give warning to the fish as it touches the detector material, the electrical properties of the detector material provides no warning to the fish that touches the detector material and the resilience of the detector material provides no warning to the fish that touches the detector material.

The fishing lure body 20 shown in FIG. 1 may be a flexible or soft thermoplastic such as plastisol or a polyvinyl chloride that allows the fishing lure 16 along with the fishing lure detector members 10 and 12 to stretch longitudinally with one another. The detector material is an electrical insulating material. The colors of the open cell plastic detector material 10 and 12 may be changed to the same color tone and texture of a plastic body 20. The fishing lure detector is incorporated in the hook portion of the fishing lure 16 and the hook 28 may be secured through the body 16 as shown in FIGS. 1 and 2. Hook 28 normally would have a barb pointing more to the left.

The new and improved fishing lure detector material provides an improved means that is positioned for detecting a fish that bites or hits the fishing lure body in order that the fisherman may set the hook in the fish. This detector provides a compatible material in reference to the lure body so as not to distract a fish from completing a strong strike or warning the fish that strikes that something is wrong. The fishing lure is improved by having a body with a preselected hook portion located adjacent and preferably in front of the barb of the fish hook. If two tandom hooks are used with the rear hook connected to the hooked portion of the first hook such as hook 28, the detecting material would extend beyond the dashed line in FIG. 2 to a point just short of the last or back hook. The detector is placed in the hook portion in order to detect when a fish bites or strikes on the fishing lure and since it is positioned relative to the hook, the fisherman can properly set the hook when a fish strike is detected.

Open cell polyurethane foam absorbs and reains liquids, popular concentrated scents and flavors such as grape and licorice can be applied to detectors 10 and 14. The retention of these flavors is greater when applied to detectors 10 and 14 than when applied to conventional smooth surface fishing worms. Although flavoring plastic worms is a common practice this procedure is not being done on hard lures. The addition of detector 14 FIG. 5 makes this possible especially for shallow and deep diving lures. Because of this property, flavor and scent can be added which will increase the use of these lures for salt water fishing.

The foam material is a three dimensional plurality of connected ring like filaments of varying diameters. The composite exhibits attached and made a part hereof show the structure illustrated in FIG. 7 in more detail.

The fishing lure detector includes a generally resilient open cell plastic material member that is durable in water and is durable after many strikes by a fish. The plastic detector material member has a surface formed by cutting an open cell material. The plastic detector material is connected to the hook portion of the fishing lure body in the lure mold during the molding process. The plastic detector material can be placed and positioned in the mold and held in position by a vacuum from an orifice and thereby generally conform to the shape of the fishing lure produced. The vacuum on the detector material aids in integrally connecting the lure body to the detector material.

The fishing lure body and the hook portion of the fishing lure body may be a flexible or soft thermoplastic such as plastisol polyvinyl chloride such as used to make plastic worms. The fishing lure 18 having body 22 and the hook portion 26 may also be constructed of hard material such as shown in FIGS. 5 and 6. The hard lure hook portion 26 may be grooved as shown in FIG. 6 to receive the fishing lure detector 14 that may be of the same material as detectors 10 and 12 and of the same structural characteristics as depicted in FIG. 7. Because the detector is an integral part of the lure, the lure will not lose its balance or action characteristics.

Protective sides 60 and 62 offer protection to detector 14 FIG. 6, during repeated use. These protected sides may be made of a pliable material which when struck by a fish will compress and allow a deep engagement between the fish and the lure. Protectors 60 and 62 may be painted in detail such as scales or other markings indicating bait fish.

The plastic material is preferably in fine porosity polyester-polyurethane foam plastic material in the 80 to 100 pores per inch range.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A method of mating a first quantity of plastisol and a first material with a first and a second side having a plurality of pores or fibers so as to prevent additional plastisol from saturating said first material during a mold filling stage wherein the mated plastisol and first material are further mated to an additional quantity of plastisol, said additional quantity of plastisol being connected exclusively to said first quantity of plastisol, there being left over a remaining portion of said first material being in a natural state and forming a natural side away from said additional quantity or plastisol, comprising the steps of:

providing said first material;
providing plastisol material and a transfer means for placing said plastisol material on the first side of said first material;
relatively moving said first material and said transfer means;
controlling the quantity of said plastisol material placed on the first side of said first material;
setting said plastisol material after it penetrates said first material to prevent total penetration to keep the second side of said first material in its pre-penetration state and to make the first side a common plastisol bonding surface and prevent further penetration of the first material by additional plastisol material during the mold filling stage;
adding additional plastisol material to said common plastisol bonding surface;
drying and cooling a combination of said first material, and said additional plastisol material;
the mold filling stage is comprised of placing said first quantity of plastisol and said first material into a mold of a fishing lure of the type used for fishing, the natural side of said first material being positioned in facial contact with the inner surface of the mold, and thereafter introducing an additional quantity of plastisol into said mold, wherein the placement of said first material in facial contact with said mold together with a pre-set layer of plastisol connected to the first side of said first material precludes further interaction of the plastisol with said first material.

2. A fishing lure and hook arrangement for amplified indication of a fish strike thereon, comprising:

a first layer of a porous material having first and second sides;
a second layer comprised of the combination of said porous material and plastisol, said second layer being formed by first mating a predetermined quantity of plastisol to said first side of said porous material and drying said second layer;
a third layer of an additional quantity of plastisol mated exclusively to said second layer, thereby leaving the second side of said porous layer in its natural state;
said third layer is in the form of a worm lure having an elongate axis.

3. The lure and hook arrangement of claim 2, wherein:

said porous layer is comprised of pores sized and shaped so that the teeth or body of a fish contacting said pores will become hung up thereon and cause a magnified tugging to be transmitted along said fishing line to a person holding said fishing line signalling thereby to the person that a fish has engaged the lure and the hook can be set,

* * * * *